(12) United States Patent
Robertson

(10) Patent No.: US 6,389,959 B1
(45) Date of Patent: May 21, 2002

(54) MULTIPURPOSE GRILL

(76) Inventor: Harold E. Robertson, 354 Claremont Ave., Mt. Vernon, NY (US) 10552

( * ) Notice: Subject to any disclaimer, the term of this patent is extended or adjusted under 35 U.S.C. 154(b) by 0 days.

(21) Appl. No.: 09/917,168

(22) Filed: Jul. 27, 2001

(51) Int. Cl.[7] .......................... A47J 37/00; A47J 37/06; A47J 37/10; H05B 1/00; H05B 3/06
(52) U.S. Cl. ............................. 99/331; 99/375; 99/378; 99/400; 99/425; 99/446; 99/349; 219/386; 219/521; 219/524
(58) Field of Search ...................... 99/326–332, 342, 99/349, 375–377, 372, 383, 400, 389, 390, 394, 391, 424, 445, 425, 426, 430, 446; 219/524, 521, 525, 533, 443, 472, 474, 477, 386, 535, 460–463; 426/523

(56) References Cited

U.S. PATENT DOCUMENTS

| 3,281,577 | A | | 10/1966 | Altemiller |
|---|---|---|---|---|
| 4,913,040 | A | | 4/1990 | Sherman et al. |
| 4,987,827 | A | * | 1/1991 | Marquez ....................... 99/331 |
| 5,129,313 | A | | 7/1992 | Coppier |
| 5,363,748 | A | | 11/1994 | Boehm et al. |
| D367,993 | S | | 3/1996 | Mc Clean |
| 5,615,604 | A | * | 4/1997 | Chenglin ...................... 99/332 |
| 5,619,907 | A | | 4/1997 | Orgelmacher |
| 6,170,389 | B1 | * | 1/2001 | Brady ........................... 99/332 |

* cited by examiner

Primary Examiner—Timothy F. Simone

(57) ABSTRACT

A multipurpose grill for grilling food items anywhere standard electricity is available. The multipurpose grill includes a lower housing member that has plurality of grilling sections, each thermostatically controlled, and a plurality of upper housing members for grilling the top sides of the food being cooked. The upper and lower housing members are pivotally connected.

17 Claims, 4 Drawing Sheets

MULTIPURPOSE GRILL

BACKGROUND OF THE INVENTION

1. Field of the Invention

The present invention relates to multipurpose grill and more particularly pertains to a new multipurpose grill for grilling food items anywhere standard electricity is available.

2. Description of the Prior Art

The use of multipurpose grill is known in the prior art. More specifically, multipurpose grill heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,619,907; U.S. Pat. No. 4,913,040; U.S. Pat. No. 5,129,313; U.S. Pat. No. 5,363,748; U.S. Pat. No. 3,281,577; and U.S. Pat. No. Des. 367,993.

While these devices fulfill their respective, particular objectives and requirements, the aforementioned patents do not disclose a new multipurpose grill. The inventive device includes a lower housing member that has plurality of grilling sections, each thermostatically controlled, and a plurality of upper housing members for grilling the top sides of the food being cooked. The upper and lower housing members are pivotally connected.

In these respects, the multipurpose grill according to the present invention substantially departs from the conventional concepts and designs of the prior art, and in so doing provides an apparatus primarily developed for the purpose of grilling food items anywhere standard electricity is available.

SUMMARY OF THE INVENTION

In view of the foregoing disadvantages inherent in the known types of multipurpose grill now present in the prior art, the present invention provides a new multipurpose grill construction wherein the same can be utilized for grilling food items anywhere standard electricity is available.

The general purpose of the present invention, which will be described subsequently in greater detail, is to provide a new multipurpose grill apparatus and method which has many of the advantages of the multipurpose grill mentioned heretofore and many novel features that result in a new multipurpose grill which is not anticipated, rendered obvious, suggested, or even implied by any of the prior art multipurpose grill, either alone or in any combination thereof.

To attain this, the present invention generally comprises a lower housing member that has plurality of grilling sections, each thermostatically controlled, and a plurality of upper housing members for grilling the top sides of the food being cooked. The upper and lower housing members are pivotally connected.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multipurpose grill apparatus and method which has many of the advantages of the multipurpose grill mentioned heretofore and many novel features that result in a new multipurpose grill which is not anticipated, rendered obvious, suggested, or even implied by any of the prior art multipurpose grill, either alone or in any combination thereof.

It is another object of the present invention to provide a new multipurpose grill which may be easily and efficiently manufactured and marketed.

It is a further object of the present invention to provide a new multipurpose grill which is of a durable and reliable construction.

An even further object of the present invention is to provide a new multipurpose grill which is susceptible of a low cost of manufacture with regard to both materials and labor, and which accordingly then susceptible of low prices of sale to the consuming public, thereby making such multipurpose grill economically available to the buying public.

Still yet another object of the present invention is to provide a new multipurpose grill which provides in the apparatuses and methods of the prior art some of the advantages thereof, while simultaneously overcoming some of the disadvantages normally associated therewith.

Still another object of the present invention is to provide a new multipurpose grill for grilling food items anywhere standard electricity is available.

Yet another object of the present invention is to provide a new multipurpose grill which includes a lower housing member that has plurality of grilling sections, each thermostatically controlled, and a plurality of upper housing members for grilling the top sides of the food being cooked. The upper and lower housing members are pivotally connected.

Still yet another object of the present invention is to provide a new multipurpose grill that is portable and powered by standard AC voltage.

Even still another object of the present invention is to provide a new multipurpose grill that has two separate grilling sections, allowing one to be used for meat, and one for vegetables, or for other similar needs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
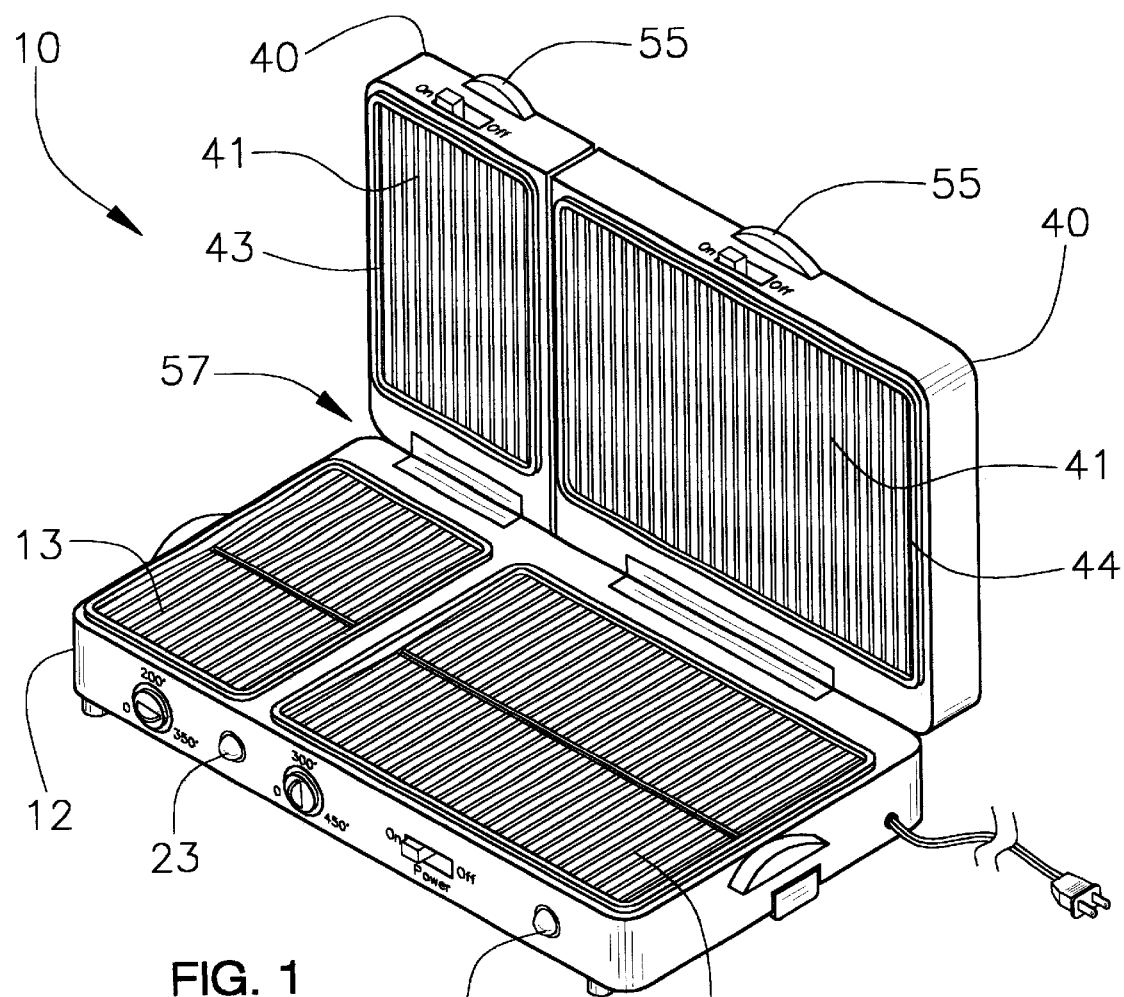
FIG. 1 is a schematic perspective view of a new multi-purpose grill according to the present invention.
Figure 2:
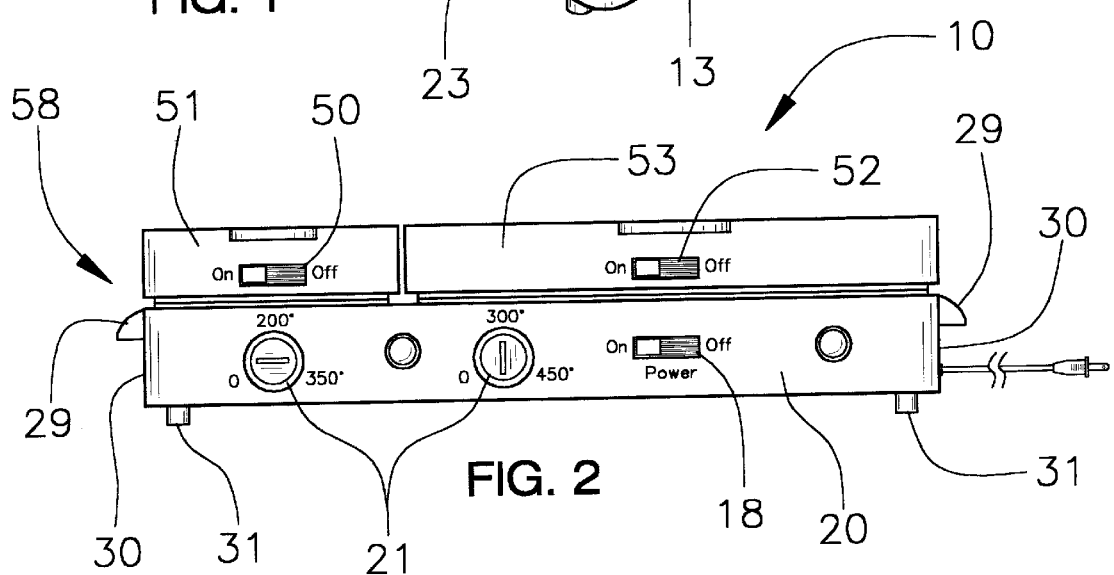
FIG. 2 is a schematic front view of the present invention.
Figure 3:
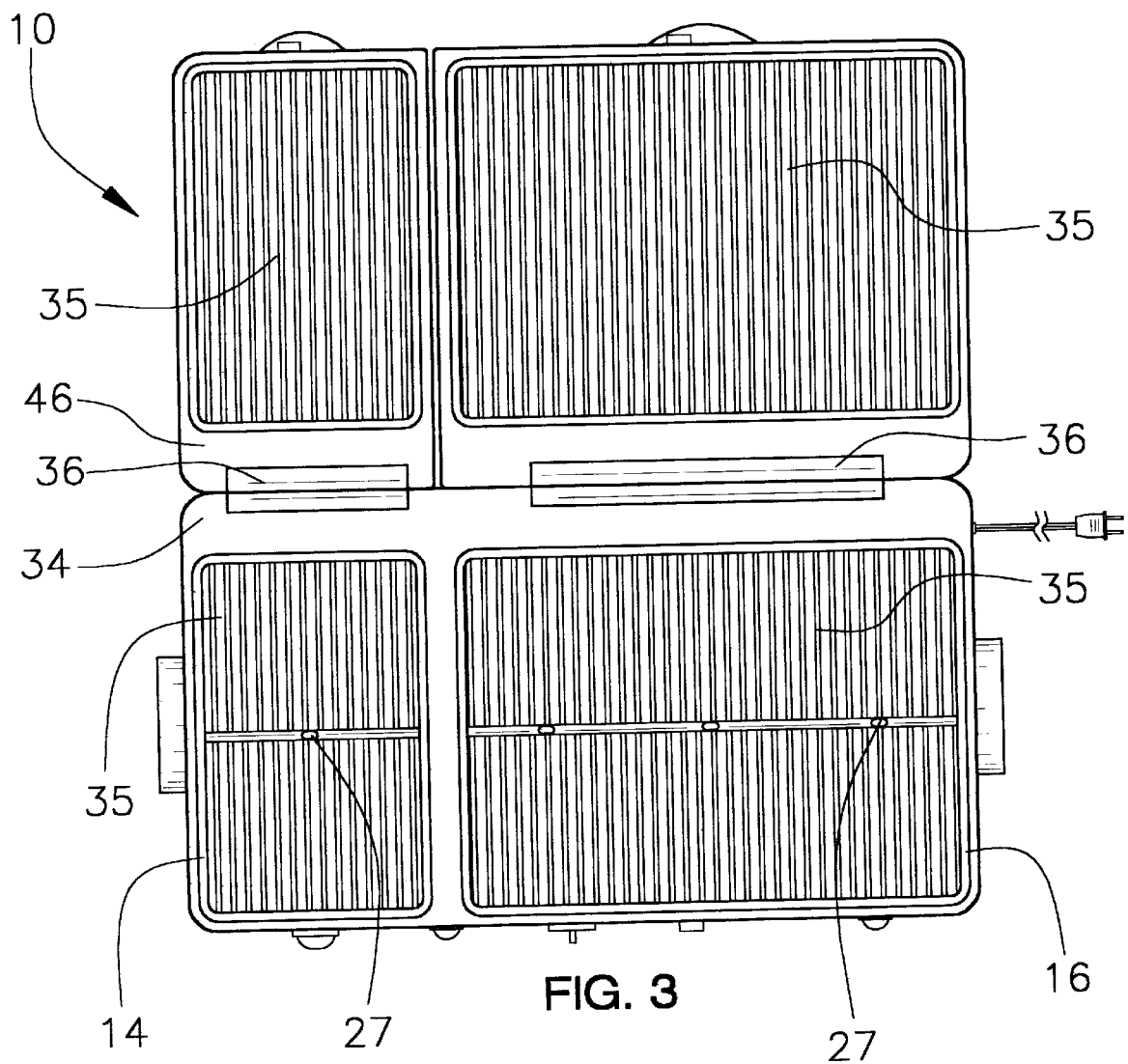
FIG. 3 is a schematic top view of the present invention.
Figure 4:
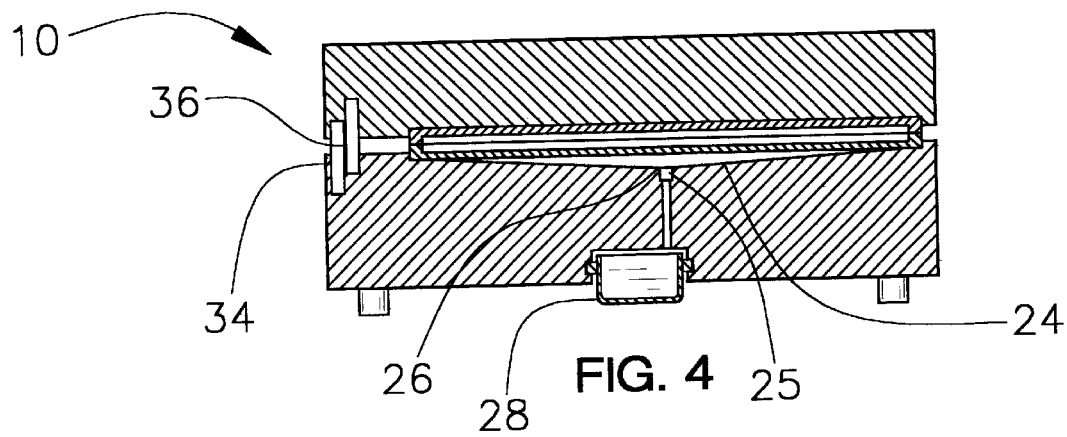
FIG. 4 is a schematic cross-sectional view of the present invention.
Figure 5:
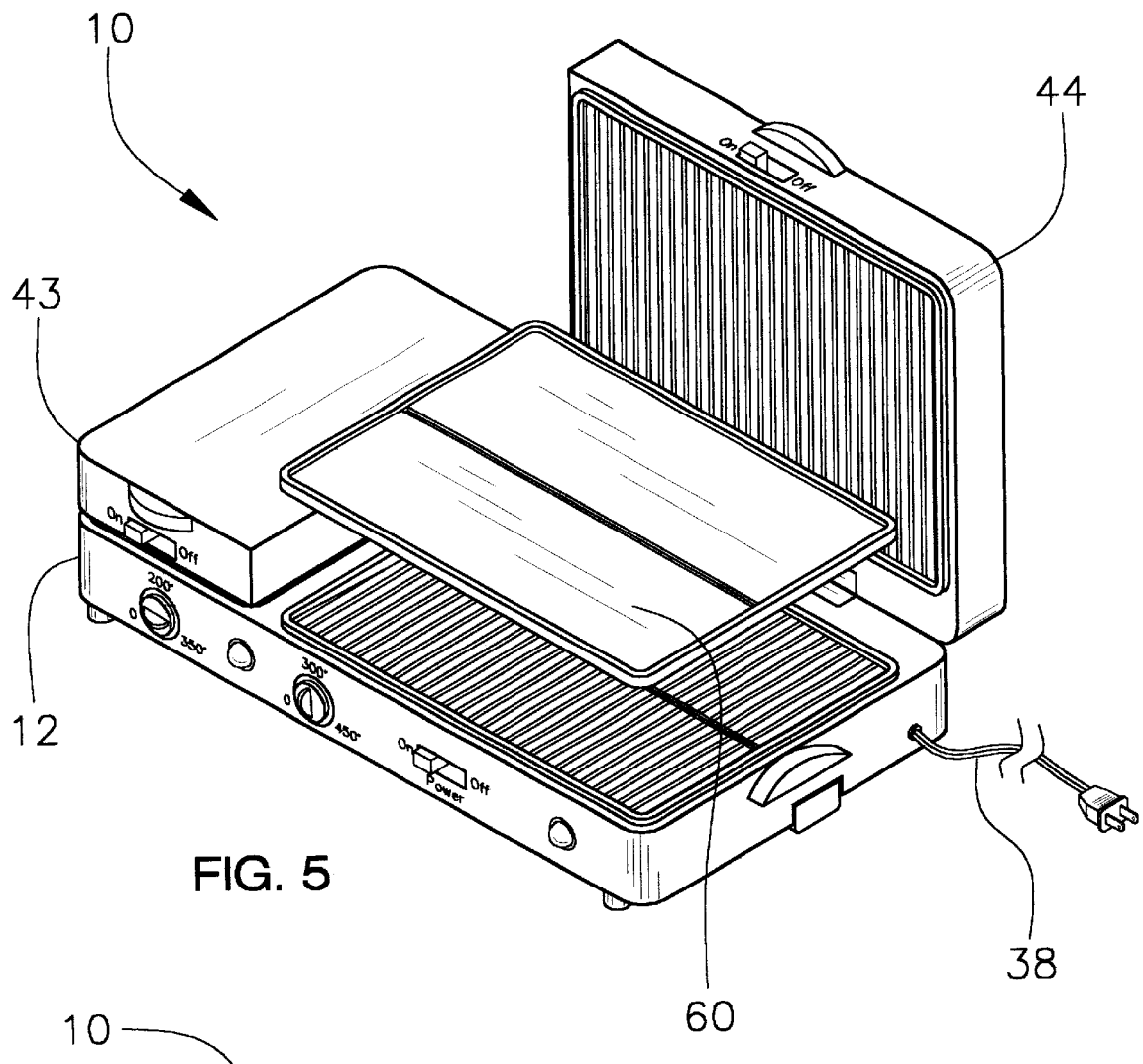
FIG. 5 is a schematic perspective view of the present invention.
Figure 6:
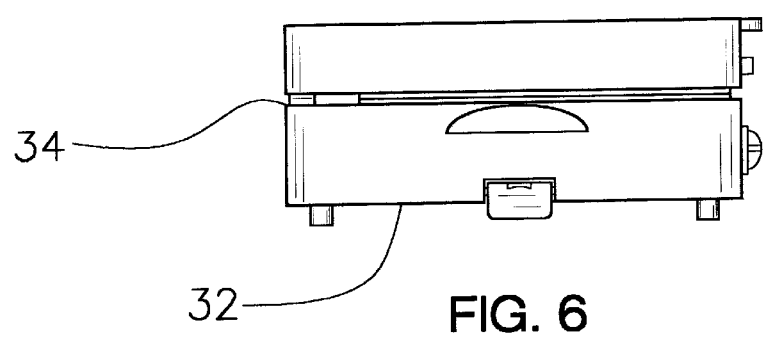
FIG. 6 is a schematic side view of the present invention.
Figure 7:
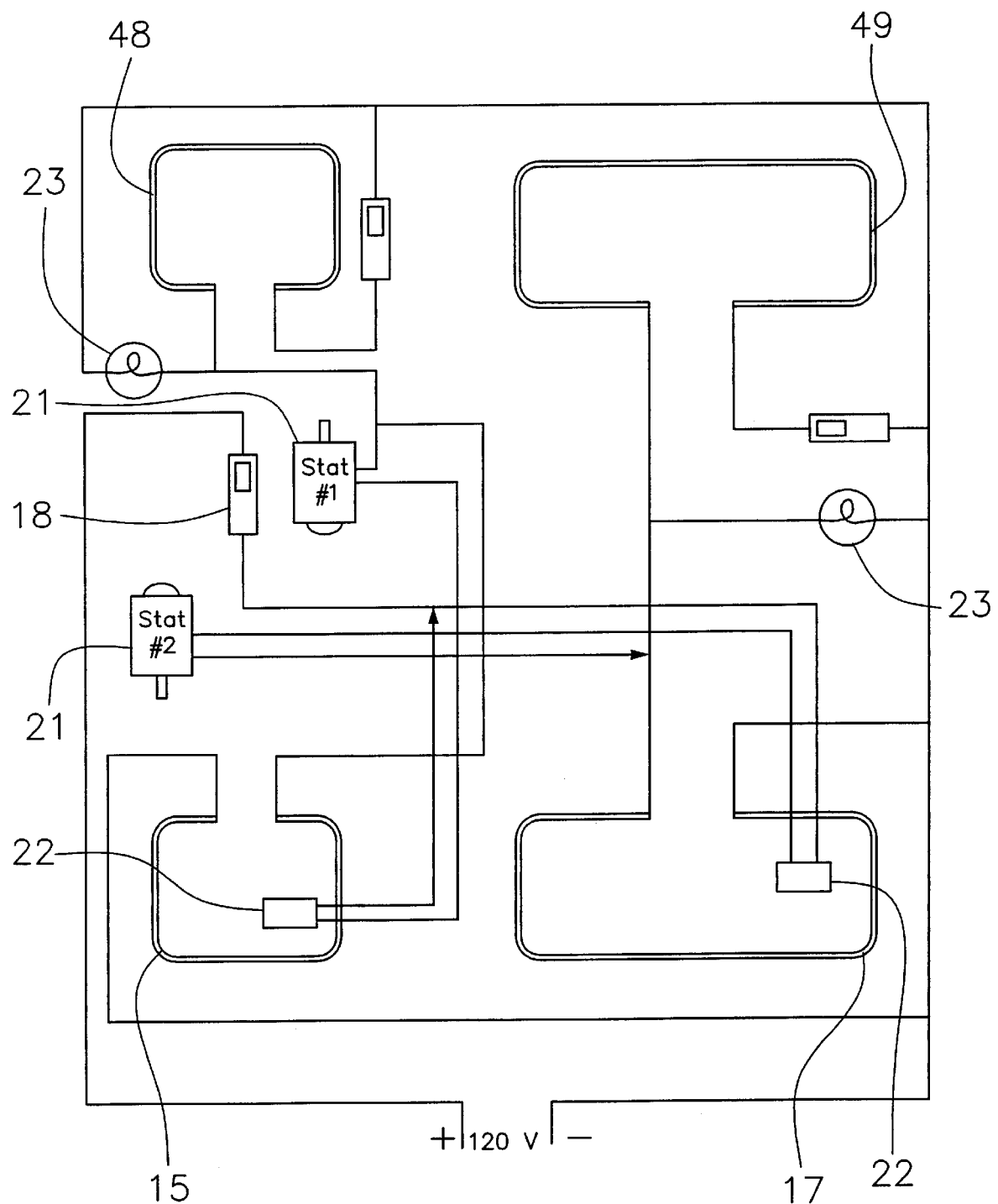
FIG. 7 is a schematic wiring diagram of the present invention.

With reference now to the drawings, and in particular to FIGS. 1 through 7 thereof, a new multipurpose grill embodying the principles and concepts of the present invention and generally designated by the reference numeral 10 will be described.

As best illustrated in FIGS. 1 through 7, the multipurpose grill 10 generally comprises a lower housing member 12 that has a plurality of lower grilling sections 13. Each of the lower grilling sections 13 is thermostatically controlled for precise cooking of food items.

A plurality of upper housing members 40 each has an upper grilling section 41 complimentary to the lower grilling sections 13 of the lower housing member 12. The upper housing members 40 are pivotally coupled to the lower housing member 12 such that each of the upper housing members 40 are positionable atop the lower housing member 12 for selectively cooking food items between the upper and lower grilling sections 41, 13.

The lower grilling sections 41, 13 comprise a lower small section 14 and a lower large section 16. The lower small section 14 includes a lower small heating element 15. The lower large section 16 includes a lower large heating element 17. The lower heating elements 15, 17 are designed for cooking the bottom side of the food items.

The lower housing member 12 has a lower housing power switch 18. The lower housing power switch 18 is positioned on a lower housing front surface 20. The lower housing power switch 18 is operationally coupled to the lower heating elements 15, 17. The lower housing power switch 18 is designed for selectively allowing power to the lower heating elements 15, 17.

The lower housing member 12 includes a plurality of thermostats 21. The thermostats 21 are positioned on the lower housing front surface 20. The thermostats 21 are operationally coupled to the lower heating elements 15, 17 such that the thermostats 21 are designed for controlling a temperature of the lower heating elements 15, 17.

The lower grilling sections 13 include a plurality of temperature sensors 22. The temperature sensors 22 are located proximate the lower heating elements 15, 17. The temperature sensors 22 are designed for sensing the temperature of the lower heating elements 15, 17 such that the temperature sensors 22 are operationally coupled to the thermostats 21, thereby allowing the thermostats 21 to regulate the temperature of the lower heating elements 15, 17.

The lower housing member 12 includes a plurality of indicator lights 23 positioned on the lower housing front surface 20. The indicator lights 23 are operationally coupled to the lower heating elements 15, 17 and are designed for indicating when power is are supplied to the lower heating elements 15, 17.

Each of the lower grilling sections 13 has a grate member 35. The grate members 35 of the lower grilling sections 13 are coupled to the lower housing member 12 above the lower heating elements 15, 17 such that the grate members 35 are for supporting the food items to be cooked.

The lower housing member 12 includes a drip surface 24. The drip surface 24 is positioned below the grate members 35. The drip surface 24 of the lower housing member 12 is designed for guiding grease from the food items being cooked to a channel portion 25 of the drip surface 24.

The channel portion 25 of the drip surface 24 is located along a medial portion 26 of the drip surface 24 along a longitudinal axis of the lower housing member 12.

The channel portion 25 of the drip surface 24 includes a plurality of apertures 27. The apertures 27 are designed for guiding the grease from the drip surface 24 downwardly off of the drip surface 24.

The lower housing member 12 includes a grease tray 28 located directly beneath the channel portion 25 of the drip surface 24. The grease tray 28 is interconnected to the apertures 27 of the channel portion 25 for receiving the grease from the drip surface 24. The grease tray 28 is slidably removable from the lower housing member 12 such that the grease tray 28 is designed for allowing the grease collected in the grease tray 28 to be disposed of.

The lower housing member 12 includes a plurality of carrying handles 29. The carrying handles 29 are located on side surfaces 30 of the lower housing member 12. The carrying handles 29 are designed for carrying the multipurpose grill 10.

The lower housing member 12 includes a plurality of support members 31. The support members 31 are located on a bottom surface 32 of the lower housing member 12. The support members 31 are designed for resting the multipurpose grill on a support surface.

The upper housing members 40 comprise an upper small section 43 and an upper large section 44. The upper sections 43, 44 are complimentary in size to the lower sections 14, 16 of the lower housing member 12 such that the upper sections 43, 44 and lower sections 14, 16 are substantially equal dimensionally.

Each of the upper sections 43, 44 is separate such that the sections are movably independent with respect to each other.

The upper sections 43, 44 include a plurality of hinge members 36. The hinge members 36 are located along a rear edge 46 of each of the upper sections 43, 44 such that the upper sections 43, 44 are pivotally coupled to a back edge 34 of the lower housing member 12.

The hinge members 36 are designed for allowing the rear edges 46 of the upper sections 43, 44 to be repositioned vertically with respect to the back edge 34 of the lower housing member 12, thereby allowing the upper housing members 40 and the lower housing member 12 to remain approximately parallel as the thickness of the food that is cooked is varied.

The upper grilling sections 41 include an upper small heating element 48 and an upper large heating element 49. The upper heating elements 48, 49 are designed for cooking the top side of the food items.

Each of the upper grilling sections 41 has a grate member 35. The grate members 35 of the upper grilling sections 41 are fixedly coupled to the upper housing members 40 below the upper heating elements 48, 49 such that the grate members 35 are designed for contacting the top sides of the food items being cooked.

The upper small section 43 includes an upper small section power switch 50. The upper small section power switch 50 is located on an upper small front surface 51. The upper small section power switch 50 is operationally coupled to the upper small heating element 48. The upper small section power switch 50 is designed for selectively allowing power to the upper small heating element 48.

The upper large section 44 includes an upper large section power switch 52. The upper large section power switch 52 is located on an upper large front surface 53. The upper large section power switch 52 is operationally coupled to the upper large heating element 49. The upper large section power switch 52 is designed for selectively allowing power to the upper large heating element 49.

Each of the upper sections 43, 44 includes a lifting handle 55. The lifting handles 55 are positioned on the upper front surfaces of the upper sections 43, 44. The lifting handles 55 are designed for selectively pivoting the upper sections 43, 44 between and open position 57 and closed position 58.

A power cord 38 is fixedly coupled to one of the side surfaces 30 of the lower housing member 12. The power cord 38 is operationally coupled to the heating elements of the multipurpose grill 10.

A cooking plate 60 is placeable upon the lower large section 16 of the lower grilling section 13 for cooking those food items requiring a flat surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multipurpose grill for cooking food items, the multipurpose grill comprising:

a lower housing member, said lower housing member having a plurality of lower grilling sections, said lower grilling sections each being thermostatically controlled for precise cooking of food items; and a plurality of upper housing members, each of said upper housing members having an upper grilling section complimentary to said lower grilling sections of said lower housing member, said upper housing members being pivotally coupled to said lower housing member such that each of said upper housing members being positionable atop said lower housing member for selectively cooking food items between said upper and lower grilling sections;

said lower grilling sections comprising a lower small section and a lower large section, said lower small section including a lower small heating element, said lower large section including a lower large heating element, said lower heating elements being adapted for cooking the bottom side of the food items.

2. The multipurpose grill as set forth including claim 1, further comprising:

said lower housing member having a lower housing power switch, said lower housing power switch being operationally coupled to said lower heating elements, said lower housing power switch being adapted for selectively allowing power to said lower heating elements.

3. The multipurpose grill as set forth including claim 1, further comprising:

said lower housing member including a plurality of thermostats, said thermostats being operationally coupled to said lower heating elements such that said thermostats being adapted for controlling a temperature of said lower heating elements of said lower grilling sections.

4. The multipurpose grill as set forth including claim 3, further comprising:

said lower grilling sections including a plurality of temperature sensors, said temperature sensors being located proximate said lower heating elements, said temperature sensors being adapted for sensing the temperature of said heating elements such that said temperature sensors are operationally coupled to said thermostats, thereby allowing said thermostats to regulate the temperature of said lower heating elements.

5. The multipurpose grill as set forth including claim 1, further comprising:

said lower housing member including a plurality of indicator lights, said indicator lights being operationally coupled to said lower heating elements, said indicator lights being adapted for indicating when power is being supplied to said lower heating elements.

6. The multipurpose grill as set forth including claim 1, further comprising:

each of said lower grilling sections having a grate member, said grate members of said lower grilling section being coupled to said lower housing member above said lower heating elements such that said grate members being for supporting the food items to be cooked.

7. The multipurpose grill as set forth including claim 6, further comprising:

said lower housing member including a drip surface, said drip surface being positioned below said grate members, said drip surface of said lower housing member being adapted for guiding grease from the food items being cooked to a channel portion of said drip surface;

said channel portion of said drip surface being located along a medial portion of said drip surface along a longitudinal axis of said lower housing member; and said channel portion of said drip surface including a plurality of apertures, said apertures being adapted for guiding the grease from said drip surface downwardly off of said drip surface.

8. The multipurpose grill as set forth including claim 7, further comprising:

said lower housing member including a grease tray, said grease tray being located directly beneath said channel portion of said drip surface, said grease tray being interconnected to said apertures of said channel portion for receiving the grease from said drip surface, said grease tray being slidably removable from said lower housing member such that said grease tray being adapted for allowing the grease collected in said grease tray to be disposed of.

9. The multipurpose grill as set forth including claim 1, further comprising:

said lower housing member including a plurality of carrying handles, said carrying handles being located on side surfaces of said lower housing member, said carrying handles being adapted for carrying said multipurpose grill; and said lower housing member including a plurality of support members, said support members being located on a bottom surface of said lower housing member, said support members being adapted for resting said multipurpose grill on a support surface.

10. The multipurpose grill as set forth including claim 1, further comprising:

said upper housing members comprising a upper small section and a upper large section, said upper sections being complimentary in size to said lower sections of said lower housing members such that said upper and lower sections are substantially equal dimensionally; and each of said upper sections being separate such that said upper sections being movably independent with respect to each other.

11. The multipurpose grill as set forth including claim 10, further comprising:

said upper sections including a plurality of hinge members, said hinge members being located along a rear edge of each of said upper sections such that said upper sections being pivotally coupled to a back edge of said lower housing member; and said hinge members being adapted for allowing said rear edges of said upper sections to be repositioned vertically with respect to said back edge of said lower housing member, thereby allowing said upper housing members and said lower housing member to remain approximately parallel as the thickness of the food that is cooked is varied.

12. The multipurpose grill as set forth including claim 11, further comprising:

said upper grilling sections including an upper small heating element and an upper large heating element, said upper heating elements being adapted for cooking the top side of the food items; and each of said upper grilling sections having a grate member, said grate members of said upper grilling sections being fixedly coupled to said upper housing members below said upper heating elements such that said grate members being adapted for contacting the top sides of the food items being cooked.

13. The multipurpose grill as set forth including claim 12, further comprising:

said upper small section including an upper small section power switch, said small section power switch being operationally coupled to said upper small heating element, said small section power switch being adapted for selectively allowing power to said upper small heating element; and said upper large section including an upper large section power switch, said large section power switch being operationally coupled to said large upper heating element, said large section power switch being adapted for selectively allowing power to said large upper heating element.

14. The multipurpose grill as set forth including claim 13, further comprising:

each of said upper sections including a lifting handle, said lifting handle being positioned on said upper front surfaces of said upper sections, said lifting handles being adapted for selectively pivoting said upper sections between and open and closed position.

15. The multipurpose grill as set forth including claim 9, further comprising:

said lower housing including a power cord.

16. The multipurpose grill as set forth including claim 1, further comprising:

a cooking plate, said cooking plate being placeable upon said lower large section of said lower grilling section for cooking those food items requiring a flat surface.

17. A multipurpose grill for cooking food items, the multipurpose grill comprising:

a lower housing member, said lower housing member having a plurality of lower grilling sections, said lower grilling sections each being thermostatically controlled for precise cooking of food items;

a plurality of upper housing members, each of said upper housing members having an upper grilling section complimentary to said lower grilling sections of said lower housing member, said upper housing members being pivotally coupled to said lower housing member such that each of said upper housing members being positionable atop said lower housing member for selectively cooking food items between said upper and lower grilling sections;

said lower grilling sections comprising a lower small section and a lower large section, said lower small section including a lower small heating element, said lower large section including a lower large heating element, said lower heating elements being adapted for cooking the bottom side of the food items;

said lower housing member having a lower housing power switch, said lower housing power switch being positioned on a lower housing front surface, said lower housing power switch being operationally coupled to said lower heating elements, said lower housing power switch being adapted for selectively allowing power to said lower heating elements;

said lower housing including a plurality of thermostats, said thermostats being positioned on said lower housing front surface, said thermostats being operationally coupled to said lower heating elements such that said thermostats being adapted for controlling a temperature of said lower heating elements of said lower grilling sections;

said lower grilling sections including a plurality of temperature sensors, said temperature sensors being located proximate said lower heating elements, said temperature sensors being adapted for sensing the temperature of said heating elements such that said temperature sensors are operationally coupled to said thermostats, thereby allowing said thermostats to regulate the temperature of said heating elements;

said lower housing including a plurality of indicator lights, said indicator lights being operationally coupled to said lower heating elements, said indicator lights being adapted for indicating when power is being supplied to said lower heating elements;

each of said lower grilling sections having a grate member, said grate members of said lower grilling section being coupled to said lower housing member above said lower heating elements such that said grate members being for supporting the food items to be cooked;

said lower housing member including a drip surface, said drip surface being positioned below said grate members, said drip surface of said lower housing member being adapted for guiding grease from the food items being cooked to a channel portion;

said channel portion of said drip surface being located along a medial portion of said drip surface along a longitudinal axis of said lower housing member;

said channel portion of said drip surface including a plurality of apertures, said apertures being adapted for guiding the grease from said drip surface downwardly off of said drip surface;

said grease tray being located directly beneath said channel portion of said drip surface, said grease tray being interconnected to said apertures of said channel portion for receiving the grease from said grease surface, said grease tray being slidably removable from said lower housing member such that said grease tray being adapted for allowing the grease collected in said grease tray to be disposed of;

said lower housing member including a plurality of carrying handles, said carrying handles being located on side surfaces of said lower housing member, said carrying handles being adapted for carrying said multipurpose grill;

said lower housing member including a plurality of support members, said support members being located on a bottom surface of said lower housing member, said support members being adapted for resting said multipurpose grill on a support surface;

said upper housing members comprising a upper small section and a upper large section, said upper sections being complimentary in size to said lower sections of said lower housing members such that said upper and lower sections are substantially equal dimensionally;

each of said upper sections being separate such that said sections being independent with respect to each other;

said upper sections including a plurality of hinge members, said hinge members being located along a rear edge of each of said upper sections such that said upper sections being pivotally coupled to a rear edge of said lower housing member;

said hinge members being adapted for allowing said rear edges of said upper sections to be repositioned vertically thereby allowing said upper housing members and said lower housing member to remain approximately parallel as the thickness of the food that is cooked is varied;

said upper grilling sections including an upper small heating element and an upper large heating element, said upper heating elements being adapted for cooking the top side of the food items;

each of said upper grilling sections having a grate member, said grate members of said upper grilling section being fixedly coupled to said upper housing members below said upper heating elements such that said grate members being adapted for contacting the top sides of the food items being cooked;

said upper small section including an upper small section power switch, said small section power switch being located on an upper small front surface, said small section power switch being operationally coupled to said upper small heating element, said small section power switch being adapted for selectively allowing power to said upper small heating element;

said upper large section including an upper large section power switch, said large section power switch being located on an upper large front surface, said large section power switch being operationally coupled to said large upper heating element, said large section power switch being adapted for selectively allowing power to said large upper heating element;

each of said upper sections including a lifting handle, said lifting handle being positioned on said upper front surfaces of said upper sections, said lifting handles being adapted for selectively pivoting said upper sections between and open and closed position;

said lower housing including a power cord, said power cord being fixedly coupled to one of said side surfaces of said lower housing member, said power cord being operationally coupled to said multipurpose grill;

a cooking plate, said cooking plate being placeable upon said lower large section of said lower grilling section for cooking those food items requiring a flat surface.

* * * * *